UNITED STATES PATENT OFFICE.

JOHN A. RENNIE, OF NEW YORK, N. Y.

METHOD OF BRAZING METALS.

No. 838,211.  Specification of Letters Patent.  Patented Dec. 11, 1906.

Application filed March 20, 1906. Serial No. 306,965.

*To all whom it may concern:*

Be it known that I, JOHN A. RENNIE, a citizen of the United States, residing at New York, in the county of New York and State of New York, have invented certain new and useful Improvements in Methods of Brazing Metals, of which the following is a specification, such as will enable those skilled in the art to which it appertains to make and use the same.

This invention relates to the brazing of metals, and by means of my process, I am enabled to braze together separate parts of metals, such as cast-iron steel, or wrought-iron, such parts being of the same metal as cast-iron to cast-iron, or such parts being of different metals, such as wrought-iron to steel, or any other combination of the above-referred-to metals. To accomplish this object, I prepare and apply a compound which consists of the following ingredients, combined in the proportions stated: oxid of manganese, powdered, two parts, by weight; red hematite ore, powdered, three parts, by weight; boracic acid, dust form, two parts, by weight. These ingredients are to be thoroughly mingled by agitation, and sufficient water is added to this mixture to make a plastic paste. This mixture is applied cold to the surfaces of the joint of the metals to be joined together, and the joint thus prepared is brought to a cherry-red heat in a furnace, to which heat is applied in any of the well-known forms, be it in a gas, coke, electric, or any other furnace usually employed for brazing purposes. When a cherry-red heat color has been attained, a flux, such as boracic acid, is applied to the jointure, and this is followed by a separate application of spelter to the joint to be brazed, with the effect that the boracic-acid flux in entering the joint tends to remove all the loose metal particles of the joint by driving or washing the same to the exterior and is followed by the spelter, which enters into the joint thus cleaned and after assuming the fluid state by means of the necessary melting heat will incorporate itself with the adjoining surfaces of the two metals to be brazed and will fill out the interstices thus prepared.

In the foregoing described method of brazing the functions of the ingredients forming the brazing compound are as follows: The oxid of manganese, which is in the anhydrate form, together with the red hematite ore chemically unite with such carbon in the cast-iron as is situated on and near the surfaces of the abutting ends of the same. The boracic acid in the powdered form in the compound is for the purpose of acting as a flux to the oxid of manganese, the red hematite ore, and the carbon, which latter is to be withdrawn from the abutting surfaces. The application of the cherry-red heat to this brazing compound produces the desired decarbonization by virtually withdrawing the carbon from the cast-iron and leaving the surface, microscopically considered, in a slight porous state. Boracic acid added thereto removes or washes away the remnants of the compound in its chemically-altered state and leaves the abutting surfaces chemically and physically clean for the application of the spelter, which is subjected to the brazing heat usual for such purposes.

If necessary, the usual pressure is applied to more thoroughly produce such incorporation of the spelter with the surface of the metal, and when withdrawn from the furnace and after cooling a perfect brazing joint has been made in the manner and by use of the ingredients above specified.

Having fully described my invention, what I claim as new, and desire to secure by Letters Patent, is—

1. The herein-described process of brazing metals which consists in decarbonizing the abutting surfaces by the application of a compound paste consisting of oxid of manganese, red hematite ore and boracic acid in dust form, fusing the compound, adding spelter and melting the same.

2. The herein-described process of brazing metals which consists in decarbonizing the abutting surfaces by the application of a compound paste consisting of the oxid of manganese, red hematite ore and boracic acid in dust form, fusing the compound, adding boracic acid to the clean and decarbonized abutting surfaces, heating the parts and adding spelter and melting the same.

In testimony that I claim the foregoing as my invention I have signed my name, in presence of the subscribing witnesses, this 19th day of March, 1906.

JOHN A. RENNIE.

Witnesses:
 F. A. STEWART,
 C. E. MULREANY.